US012632420B2

(12) United States Patent
Schneider et al.

(10) Patent No.:  US 12,632,420 B2
(45) Date of Patent:  May 19, 2026

(54) LOCK CONTROLLER AND METHOD TO IMPLEMENT BUFFER LOCK UTILIZING REMOTE DIRECT MEMORY ACCESS

(71) Applicant: HUAWEI TECHNOLOGIES CO., LTD., Shenzhen (CN)

(72) Inventors: Zvi Schneider, Munich (DE); Assaf Natanzon, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/769,063

(22) Filed: Jul. 10, 2024

(65) Prior Publication Data

US 2024/0362191 A1      Oct. 31, 2024

Related U.S. Application Data

(63) Continuation of application No. PCT/EP2022/050297, filed on Jan. 10, 2022.

(51) Int. Cl.
  *G06F 16/176*        (2019.01)
  *G06F 15/173*        (2006.01)
(52) U.S. Cl.
  CPC .... *G06F 16/1774* (2019.01); *G06F 15/17331* (2013.01)
(58) Field of Classification Search
  CPC ...................... G06F 16/1774; G06F 15/17331
  See application file for complete search history.

(56) References Cited

U.S. PATENT DOCUMENTS

| | | | | | |
|---|---|---|---|---|---|
| 5,513,314 | A | * | 4/1996 | Kandasamy | ........ G06F 11/2048 |
| | | | | | 714/E11.007 |
| 6,539,446 | B1 | * | 3/2003 | Chan | ........................ G06F 9/52 |
| | | | | | 710/200 |
| 2005/0240585 | A1 | * | 10/2005 | Makhervaks | ........... G06F 9/526 |
| 2006/0235846 | A1 | * | 10/2006 | Murray | ............. G06F 16/90344 |
| 2010/0191884 | A1 | * | 7/2010 | Holenstein | .......... G06F 16/2343 |
| | | | | | 707/613 |
| 2021/0374089 | A1 | | 12/2021 | Ohtsuji | |
| 2023/0205784 | A1 | * | 6/2023 | Dusek | ................. G06F 16/2365 |
| | | | | | 707/615 |

OTHER PUBLICATIONS

Wikipedia, Circular Buffer, https://web.archive.org/web/20191021073152/https://en.wikipedia.org/wiki/Circular_buffer, Oct. 21, 2019, 6 pp. (Year: 2019).*

* cited by examiner

*Primary Examiner* — Marc S Somers
(74) *Attorney, Agent, or Firm* — Leydig, Voit & Mayer, Ltd.

(57)       ABSTRACT
A lock controller is connected to a primary lock server having a primary memory to implement a primary ring buffer lock and a secondary lock server having a secondary memory to implement a mirrored primary ring buffer lock. The lock controller sends a first lock request and first read request to the primary lock server and receives a first order. Further, the lock controller sends a second lock request and a second read request to the secondary lock server and receives a second order. Further, the lock controller compares the first and second order, and if the second order differs from the first order, then sends a reorder request to the secondary lock server indicating the first order, so that the execution order of lock requests can be maintained. The disclosed lock controller ensures low latency and efficiently handles a server failure.

15 Claims, 6 Drawing Sheets

PRIMARY LOCK SERVER 104

| Lx-in-cyclic | buff | Ix-in-buff |
|---|---|---|
|  |  | 0 |
|  |  | 1 |
|  | head | 2 |
| 0 | C1-L | 3 |
| 1 | C2-L | 4 |
| 2 | C3-L | 5 |
| 3 | C1-U | 6 |
| 4 | C5-L | 7 |
| 5 | C4-L | 8 |
| 6 | C2-U | 9 |
| 7 | C6-L | 10 |
| 8 | C2-L | 11 |
| 9 | C1-L | 12 |
|  |  | 13 |
|  |  | 14 |

SECONDARY LOCK SERVER 106

| Lx-in-cyclic | buff | Ix-in-buff |
|---|---|---|
|  | head | 0 |
| 0 | C1-L | 1 |
| 1 | C2-L | 2 |
| 2 | C3-L | 3 |
| 3 | C1-U | 4 |
| 4 | C5-L | 5 |
| 5 | C4-L | 6 |
| 6 | C7-U | 7 |
| 7 | C2-U | 8 |
| 8 | C1-L | 9 |
| 9 | C2-L | 10 |
| 10 | C6-L | 11 |
|  |  | 12 |
|  |  | 13 |
|  |  | 14 |

Out of order entries in secondary lock server

SECONDARY LOCK SERVER 106

| Lx-in-cyclic | buff | Ix-in-buff |
|---|---|---|
|  | head | 0 |
| 0 | C1-L | 1 |
| 1 | C2-L | 2 |
| 2 | C3-L | 3 |
| 3 | C1-U | 4 |
| 4 | C5-L | 5 |
| 5 | C4-L | 6 |
| 6 | C7-U | 7 |
| 7 | C2-U | 8 |  ← Y-1 |
| 8 | C1-L | 9 |
| 9 | C2-L | 10 |  ← X |
| 10 | C6-L | 11 |  ← X |
| 11 | 10—9.1 | 12 |
| 12 | 11—9.0 | 13 |
|  |  | 14 |

C2 and C6 will send reorder entries

Fix secondary lock server's ordering

< ix-in-buff > X → (is before) <ix-in-buff> (Y).<ix in the reorder list> Z

FIG. 5

SENDING FIRST LOCK REQUEST TO PRIMARY LOCK SERVER
602

SENDING FIRST READ REQUEST TO PRIMARY LOCK SERVER
604

SENDING SECOND LOCK REQUEST TO SECONDARY LOCK SERVER
606

SENDING SECOND READ REQUEST TO SECONDARY LOCK SERVER
608

RECEIVING FIRST ORDER INDICATING ORDER OF FIRST LOCK REQUEST AND FIRST READ REQUEST FROM PRIMARY LOCK SERVER
610

RECEIVING SECOND ORDER INDICATING ORDER OF SECOND LOCK REQUEST AND SECOND READ REQUEST FROM SECONDARY LOCK SERVER
612

COMPARING FIRST AND SECOND ORDER, AND IF SECOND ORDER DIFFERS FROM FIRST ORDER, THEN SEND REORDER REQUEST TO SECONDARY LOCK SERVER INDICATING FIRST ORDER
614

FIG. 6

LOCK CONTROLLER AND METHOD TO IMPLEMENT BUFFER LOCK UTILIZING REMOTE DIRECT MEMORY ACCESS

CROSS-REFERENCE TO RELATED APPLICATIONS

This application is a continuation of International Application No. PCT/EP2022/050297, filed on Jan. 10, 2022, the disclosure of which is hereby incorporated by reference in its entirety.

TECHNICAL FIELD

Embodiments of this application relate to the field of locking of various computing devices and more specifically, to a lock controller and method to implement a ring buffer lock utilizing remote direct memory access.

BACKGROUND

Generally, locking of various computing systems plays a major role in resource management, for example, resource sharing, resource organizing etc. As many computing systems share the same resources over the same network, therefore, it is required to maintain a proper distribution of resources, for example, which computing system use which resource and for what time etc. Locking is performed to manage the resources in the network so that the resources are adequately shared among the various computing systems. The resources may include, a number of client applications, software applications (apps), processes, etc., shared in the network, and are available on a shared memory. The shared memory can be accessed via remote direct memory access (RDMA). The RDMA allows access of the shared memory data from one host to another, due to which the resources are easily accessible to every client attached with its corresponding host (or server).

The existing lock mechanism involves central processing unit (CPU) and multiple round trips of communication to create and manage the locks. The multiple round trips of communication and usage of the CPU increases the latency of the existing lock mechanism thereby, making a computing system less efficient. On the other hand, it is difficult for the computing system to maintain the execution order of the lock requests received by the client devices, especially during a server failure. Thus, there exists a technical problem of how to lower down the latency of the lock mechanism and how to handle the lock requests and maintain their execution order, for example, during a server failure.

Therefore, in light of the foregoing discussion, there exists a need to overcome the aforementioned drawbacks associated with the conventional lock mechanisms.

SUMMARY

The present disclosure provides a lock controller and method to implement a primary ring buffer lock utilizing remote direct memory access (RDMA). The present disclosure provides a solution to the existing problem of how to lower down the latency of the locking mechanism and how to maintain the execution order of lock requests, for example, during a server failure. An aim of the present disclosure is to provide a solution that overcomes at least partially the problem encountered in prior art and provides an improved lock controller and method to provide an improved lock controller and locking mechanism with low latency and capable of handling the lock requests and maintaining their execution order during a server failure.

One or more objectives of the present disclosure are achieved by the solutions provided in the enclosed independent claims. Advantageous implementations of the present disclosure are further defined in the dependent claims.

In one aspect, the present disclosure provides a lock controller configured to be operatively connected to a primary lock server arranged to implement a primary ring buffer lock utilizing a primary memory, and a secondary lock server arranged to implement a mirrored primary ring buffer lock utilizing a secondary memory. Further, the lock controller is configured to send a first lock request and a first read request to the primary lock server. Further, the lock controller is configured to send a second lock request and a second read request to the secondary lock server. Further, the lock controller is configured to receive a first order indicating the order of the first lock request and the first read request from the primary lock server and to receive a second order indicating the order of the second lock request and the second read request from the secondary lock server. Further, the lock controller is configured to compare the first and second order, and if the second order differs from the first order, then send a reorder request to the secondary lock server indicating the first order.

The lock controller of the present disclosure ensures low latency and handles the server failure effectively. By virtue of maintaining the lock request received by different client devices and maintaining the execution order by implementing the primary ring buffer lock and the mirrored primary ring buffer lock using two servers, the locking mechanism is improved effectively while reducing the latency at the same time.

In an implementation form, the first order comprises a lock request that appears at a first position, and the second order comprises the same lock request that appears at a second position. The lock controller is further configured to determine that the second order differs from the first order in that the second position in the second order is after the first position, and in response thereto, send the reorder request.

Beneficially, the first order that comprises the lock request and the second order that comprises the same lock request that appears in the second position, enables the lock controller to know that the first order is different from the second order. Such differentiation allows the lock controller to send reorder requests to maintain the execution order for both servers.

In a further implementation form, the lock controller is configured to determine that the second order differs from the first order in that the second position in the second order is before the first position, and in response thereto, abstain from sending the reorder request, and to wait for the first position to be reached in the second order for the secondary lock server before executing the lock request at the second position.

Beneficially, the difference of order enables the lock controller to know that there is a difference between both the orders (i.e., first and second order). Such difference makes the lock controller aware of the need for reordering of the second order to further maintain the master order of execution.

In a further implementation form, the lock controller is further configured to determine one or more positions in the second order that is different from corresponding positions in the first order and send a reorder request for each position.

Beneficially, by virtue of determination that if the first and second position in the second order is different provides preservation of execution order (or master order) to handle two queues together so that if two clients request for a lock at the same time, the order remains same on the server.

In a further implementation form, the lock controller is further configured to determine a current position for a request in the second order that is after a corresponding position in the first order for the same request, determine the position preceding the corresponding position in the first order, and send the reorder request indicating that the request should be after the preceding position in the second order.

Beneficially, the determination of the current position for a request in the second order enables the lock controller to know the exact position of the request and further determine the position to send reorder request to maintain the execution order.

In a further implementation form, the lock controller is configured to access either of the primary and secondary memories directly utilizing remote direct memory access.

By virtue of directly accessing each of the primary and secondary memories utilizing remote direct memory access, access time is reduced, which further results in a reduced latency as well. In a further implementation form, the primary memory is a primary persistent memory and the secondary memory is a secondary persistent memory.

By virtue of using each of the primary and secondary memories as the persistent memories, a lower latency can be obtained.

In yet another aspect, the present disclosure provides a client device comprising a lock controller.

Beneficially, the client device enables the client to send the lock requests through its lock controller.

In yet another aspect, the present disclosure provides a lock system comprising a client device, a primary lock server, a secondary lock server and a system controller that is configured to determine that the primary lock server is failing, and in response thereto, assign the secondary lock server to act as the primary lock server and generate a new secondary lock server.

Beneficially, the assignment of a secondary server as a primary server enables the lock system to efficiently handle a server failure.

In yet another aspect, the present disclosure provides a method of controlling a lock for a client device operatively connected to a primary lock server arranged to implement a primary ring buffer lock utilizing a primary memory and a secondary lock server arranged to implement a mirrored primary ring buffer lock utilizing a secondary memory, where the lock controller is configured to access either of the primary and secondary memories directly utilizing remote direct memory access. The method further comprises of sending a first lock request to the primary lock server, sending a first read request to the primary lock server, sending a second lock request to the secondary lock server and sending a second read request to the secondary lock server. The method further comprises of receiving a first order indicating the order of the first lock request and the first read request from the primary lock server and receiving a second order indicating the order of the second lock request and the second read request from the secondary lock server. The method further comprises comparing the first and second order, and if the second order differs from the first order, then sending a reorder request to the secondary lock server indicating the first order.

The method achieves all the advantages and technical effects of the lock controller of the present disclosure.

It is to be appreciated that all the aforementioned implementation forms can be combined. It is be noted that all devices, elements, circuitry, units and means described in the present application could be implemented in the software or hardware elements or any kind of combination thereof. All steps which are performed by the various entities described in the present application, as well as the functionalities described to be performed by the various entities, are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 5 is an illustration of servers describing reordering of the locks, in accordance with an embodiment of the present disclosure; and FIG. 6 is a flowchart of a method of controlling a lock for a client device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Figure 1:
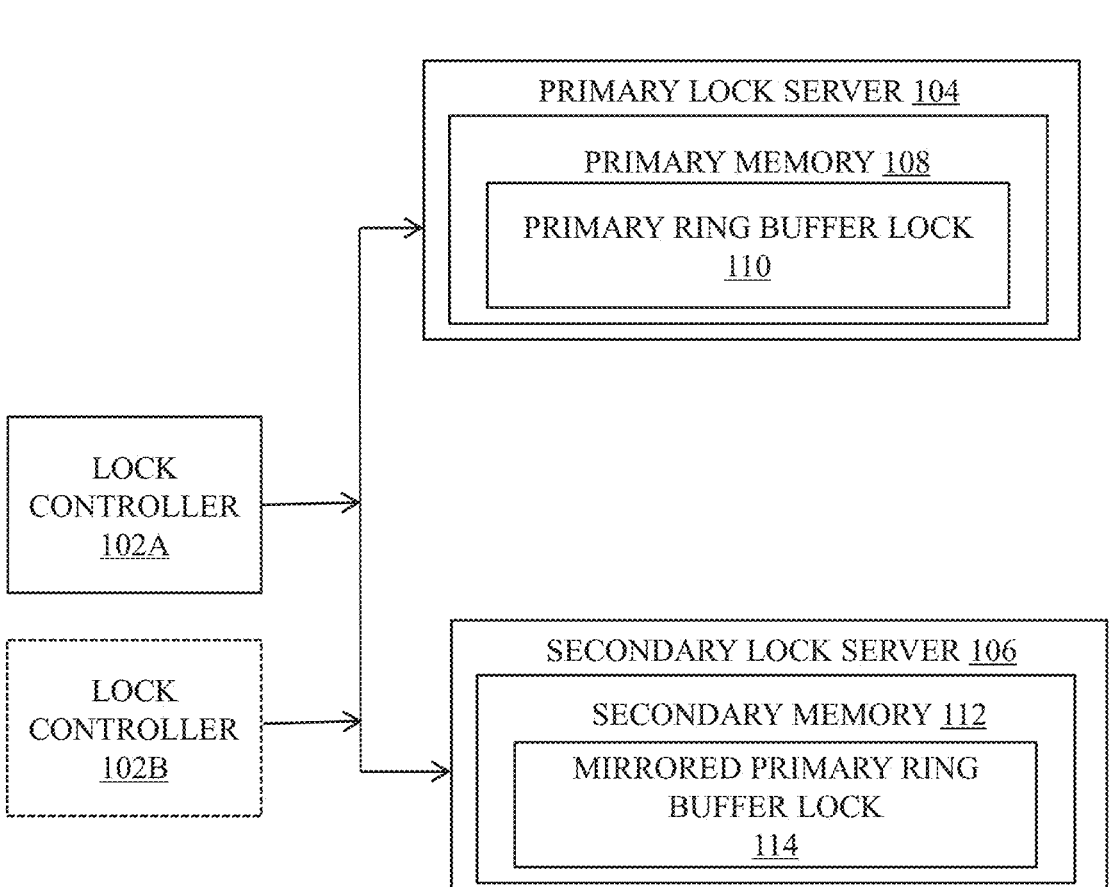
FIG. 1 is a network diagram that illustrates operative connections of a lock controller to various other components, in accordance with an embodiment of the present disclosure.

FIG. 1 is a network diagram that illustrates operative connections of a lock controller to various other components, in accordance with an embodiment of the present disclosure. With reference to FIG. 1, there is shown a block diagram 100 that includes a lock controller 102A, a primary lock server 104 and a secondary lock server 106. The primary lock server 104 includes a primary memory 108 that includes a primary ring buffer lock 110. The secondary lock server 106 includes a secondary memory 112 that includes a mirrored primary ring buffer lock 114. There is further shown another lock controller 102B.

The lock controller 102A may include suitable logic, circuitry, interfaces, and/or code that is connected to the primary lock server 104 and the secondary lock server 106 to implement the primary ring buffer lock 110 and the mirrored primary ring buffer lock 114, respectively. The lock controller 102A may be comprised by a client device, which may be referred to as a lock client device. The client device comprising the lock controller 102A is described in detail, for example, in FIG. 2. In one implementation, the lock controller 102A may be a software running on the client device.

The primary lock server 104 may be configured to save one or more locks (or lock requests) to control the flow of data across a network. The primary lock server 104 may include suitable logic, circuitry, interfaces, and/or code that is configured to implement the primary ring buffer lock 110. Examples of implementation of the primary lock server 104 may include, but are not limited to, a storage server, a cloud server, a web server, an application server, or a combination thereof.

The secondary lock server 106 may be configured to implement the mirrored primary ring buffer lock 114. Examples of implementation of the secondary lock server 106 may include, but are not limited to, a storage server, a cloud server, a web server, an application server, or a combination thereof.

Each of the primary memory 108 and the secondary memory 112 may include suitable logic, circuitry, interfaces, or code that is configured to store the instructions executable by the lock controller 102A. Examples of implementation of each of the primary memory 108 and the secondary memory 112 may include, but are not limited to, an Electrically Erasable Programmable Read-Only Memory (EEPROM), Random Access Memory (RAM), Read Only Memory (ROM), Hard Disk Drive (HDD), Flash memory, Solid-State Drive (SSD), persistent memory, remote direct memory access (RDMA), or CPU cache memory.

The primary ring buffer lock 110 may be referred to as a circular queue that maintains an execution order of various lock requests in a circular fashion. Examples of the primary ring buffer lock 110 may include, but are not limited to, a circular buffer, a circular queue or a cyclic buffer. The primary ring buffer lock 110 is configured to store the number of lock requests received from various clients in the primary lock server 104.

The mirrored primary ring buffer lock 114 may be configured to mirror the primary ring buffer lock 110. Therefore, functioning of the mirrored primary ring buffer lock 114 is same as that of the primary ring buffer lock 110. Similar to the primary ring buffer lock 110, the mirrored primary ring buffer lock 114 may be configured to store the number of lock requests received from various clients in the secondary lock server 106.

In operation, the lock controller 102A is configured to be operatively connected to the primary lock server 104 arranged to implement the primary ring buffer lock 110 utilizing the primary memory 108. The lock controller 102A is further configured to be operatively connected to the secondary lock server 106 arranged to implement the mirrored primary ring buffer lock 114 utilizing the secondary memory 112. The lock controller 102A is configured to be connected to the two servers, that is the primary lock server 104 and the secondary lock server 106, to implement a locking mechanism. Generally, the locking mechanism may be defined as a locking mechanism to provide equal data or resource distribution among all the computing devices attached to the network. Moreover, in the locking mechanism, one or more locks are kept in the primary lock server 104 and the one or more locks are not lost even in a case of server failure. Therefore, the lock controller 102A may be configured to handle server failures as well. Each of the primary lock server 104 and the secondary lock server 106 maintains a ring of lock tickets in the primary ring buffer lock 110 and the mirrored primary ring buffer lock 114, respectively, that is accessible by RDMA memory from any client. The lock ticket contains a client ID, lock-operation, pending lock numbers and a timestamp, which is optional. The client ID comprises a number of bits depending on the maximum number of clients. For example, if the maximum number of clients is 100, then, 7 bits are sufficient. The client ID includes the number of bits where, 0 is reserved. The lock ticket further includes one bit for a lock operation that represents two operations, either "LOCK", or "UNLOCK", from which the lock is handled. The pending lock number refers to the number of clients waiting for the lock during the execution slot for their particular ticket. The pending lock numbers are updated during clean-up of the primary ring buffer lock 110 and the mirrored primary ring buffer lock 114 so that the exact pending lock numbers can be achieved. The number of pending locks can be as high as the maximum number of clients and thus, requires the same number of bits as that of the client ID. For example, if the number of maximum clients is 100, then the number of pending locks may be 100, and each of the pending lock numbers is of 7 bits. The timestamp provides information for statistics and debugging. The timestamp comprises 32 bits of size. Moreover, the number of bits and the content of the lock ticket may have other possible values without limiting the scope of the disclosure. The multiple locks may be synchronized by using a shared receive queue (SRQ) of each of the primary lock server 104 and the secondary lock server 106. Alternatively stated, each of the primary lock server 104 and the secondary lock server 106 is configured to manage its own shared resource queue for the maintenance of lock request's order. All the entries in each of the primary ring buffer lock 110 and the mirrored primary ring buffer lock 114 are initialized to the client ID "0", and the pending lock numbers is set to a non-zero value. The shared receive queue in each of the primary lock server 104 and the secondary lock server 106 is created, and the lock ticket is posted in each of the primary ring buffer lock 110 and the mirrored primary ring buffer lock 114 through RDMA verbs. The RDMA verbs correspond to the post_srq_recv RDMA verb, due to which all the lock tickets are ready for lock request (i.e., lock/unlock) by the client. The client creates a lock ticket with the client ID, and the lock operation is set to "LOCK". The server (i.e., the primary lock server 104 and the secondary lock server 106) maintains the current state of the lock in the respective SRQ queue and keeps track of the current number of pending lock requests received from the clients that are asynchronously cleaned. The client relies on the number of pending locks and to check the pending locks, the lock entries (e.g., old lock entries) are always cleaned so that the client can rely upon the new entries. The old lock entries are cleaned through an event that is implemented when the queue is half full. In an example, an event is referred to as ibv_event_srq_limit_reached, this event provides ticket clean-up. All the entries (e.g., locks and unlocks) in each of the SRQ queue except the last M×2 entries are traversed, in the clean-up process by the lock controller 102A. After traversing the previous entries (i.e., locks and unlocks) except the last M×2 entries, the client ID is deleted and a counter is put to determine that how many locks are open at that point of time. Alternatively stated, the data of all the previous commands is deleted where the client ID is zeroed, except the last M×2 entries. In an implementation, the reordering commands are also traversed and cleaned during the clean-up process. For each lock operation, there is an increase in the number of pending locks by 1 and for each unlock operation, there is a decrease in the number of pending locks by 1. The last M×2 entries may contain lock requests that are still alive (or pending) and thus, should not be cleaned up. However, it is possible to clean up more entries but only those entries are cleaned up for which it is ensured that all the tickets are finished. The implementation of the ticket clean-up process will atomically change the client ID of the ticket to zero and the number of pending locks to the current count of pending locks that will be later posted for further lock requests.

The lock controller 102A is configured to send a first lock request to the primary lock server 104. In an implementation, the first lock request may be a "RDMA send" command, which the lock controller 102A is configured to send to the primary lock server 104. In such implementation, the lock controller 102A is configured to create a ticket with a client ID and lock operation set to "LOCK". For the first lock request (i.e., the "RDMA send" command), the lock controller 102A is further configured to send the ticket inline and non-signalled, without waiting for completion. In another implementation, the first lock request may have an "UNLOCK" operation. In such implementation, the lock controller 102A is configured to create a ticket with the client ID and lock operation set to "UNLOCK".

The lock controller 102A is further configured to send a first read request to the primary lock server 104. In an implementation, the first read request may be a "RDMA read" request. The first read request is used to read the primary ring buffer lock 110 and hence, provides the current status of the primary ring buffer lock 110. The first read request provides the information related to the number of locks, which are hold and unlocks to the lock controller 102A.

The lock controller 102A finds the first non-zero client ID in the primary ring buffer lock 110 after sending the first read request to the primary lock server 104. While, the previous entry in the primary ring buffer lock 110 has to be with zeroed client id and should contain the number of pending locks before the first non-zero entry. The lock controller 102A traverses over all the tickets and count the locks. The lock controller 102A is configured to add 1 to the number of pending locks for each lock operation and decrease 1 for each unlock operation. If the pending lock number is 1, then it shows that the lock controller 102A holds the lock and thus, can use the shared resource queue. If the pending lock number is not 1, then the client device (e.g., the client device comprising the lock controller 102A) will further send the first read request again, and further counts the primary ring buffer lock 110 till the lock controller 102A gets the pending lock number as 1. Alternatively stated, all the number of locks and unlocks before the lock of the client device (i.e., the client device comprising the lock controller 102A) in the primary ring buffer lock 110 are checked and if all the previous locks are unlocked, then, the client device (i.e., the client device comprising the lock controller 102A) is said to hold the lock.

The lock controller 102A is further configured to send a second lock request to the secondary lock server 106. The second lock request is similar to the first lock request. Therefore, in an implementation, the second lock request may be a "RDMA send" command, which the lock controller 102A is configured to send to the secondary lock server 106. For the second lock request (i.e., the "RDMA send" command), the lock controller 102A is further configured to send the ticket inline and non-signalled, without waiting for completion. Alternatively stated, the first lock request and the second lock request collectively, refer to the same lock command from the same client device (i.e., the client device comprising the lock controller 102A).

The lock controller 102A is configured to send a second read request to the secondary lock server 106. The second read request may correspond to a "RDMA read" command, which is sent by the lock controller 102A to read the mirrored primary ring buffer lock 114 of the secondary lock server 106. The second read request (i.e., the "RDMA read" command) provides the current status of the mirrored primary ring buffer lock 114 to the lock controller 102A. The second read request provides the information related to the number of locks, which are hold and unlocks to the lock controller 102A so that the secondary lock server 106 can maintain the shared receive queue.

After sending the second read request to the secondary lock server 106, the lock controller 102A finds the first non-zero client ID in the mirrored primary ring buffer lock 114. The lock controller 102A is configured to add 1 to the number of pending locks for each lock operation and decrease 1 for each unlock operation. If the pending lock number is 1, then it shows that the lock controller 102A holds the lock if all the previous locks are unlocked and thus, can use the shared resource queue. If the pending lock number is not 1, then the client device (i.e., the client device comprising the lock controller 102A) will further send the second read request again, and further counts the mirrored primary ring buffer lock 114 till the lock controller 102A gets the pending lock number as 1.

The lock controller 102A is configured to receive a first order indicating the order of the first lock request and the first read request from the primary lock server 104. The primary lock server 104 receives the first lock request (i.e., the "RDMA send" command) and the first read request (i.e., the "RDMA read" command) sent by the lock controller 102A and similarly, the secondary lock server 106 receives the second lock request (i.e., the "RDMA send" command) and the second read request (i.e., the "RDMA read" command) sent by the lock controller 102A. Thus, overall, four requests are sent together to the two servers (i.e., the primary lock server 104 and the secondary lock server 106). The first order indicates the order of the first lock request and the first read request in the primary ring buffer lock 110. The first order provides the execution order of the first lock request and the first read request. The execution order refers to the order in which the first lock request and the first read request are executed.

The lock controller 102A is also configured to receive a second order indicating the order of the second lock request and the second read request from the secondary lock server 106. The second order indicates the order of the second lock request and the second read request in the mirrored primary ring buffer lock 114.

The lock controller 102A is configured to compare the first and second order, and if the second order differs from the first order, then send a reorder request to the secondary lock server 106 indicating the first order. In a case, when there is only a single client device (i.e., the client device comprising the lock controller 102A) requesting for the lock, the lock controller 102A is configured to read the ring buffers (i.e., the primary ring buffer lock 110 and the mirrored primary ring buffer lock 114) of each of the servers and receive the first order related to the first lock request and the second order related to the second lock request. Thereafter, the lock controller 102A is configured to compare the received first order and the second order. If no other client device asked for the lock at the same time, then, the first lock request and the second lock request lie at the same logical place in the respective shared receive queue (SRQ) of the primary lock server 104 and the secondary lock server 106, which means that the first lock request and the second lock request are handled at the same time. Alternatively stated, the first order and the second order are same in such a case. Thus, the latency is extremely low in case of no conflicts. In another case, if another client device (e.g., a client device comprising the other lock controller 102B) asked for the lock at the same time when the client device (i.e., the client device comprising the lock controller 102A) has asked. In such case, the first order and the second order may be different in the respective shared receive queue of the primary lock server 104 and the secondary lock server 106. Alternatively stated, the first order and the second order may be different on one server (e.g., the secondary lock server 106) than on another server (e.g., primary lock server 104). In such case, when the second order differs from the first order, the lock controller 102A is configured to send the reorder request to the secondary lock server 106 indicating the first order. As both the lock servers (i.e., the primary lock server 104 and the secondary lock server 106) maintains separate shared receive queues, it is important to maintain both the shared receive queues at the same time to provide a single execution order because if two client devices ask for a lock at the same time due to which, on one server, the order of the lock requests become different than on the other server, hence, the single execution order cannot be maintained. Thus, to maintain the single execution order, the lock controller 102A is configured to send the reorder request to the secondary lock server 106. However, in practice, in addition to the client device (i.e., the client device comprising the lock controller 102A) and the other client device (i.e., the client device comprising the other lock controller 102B), there may be multiple client devices with the respective lock controllers, which may ask for the lock simultaneously, hence, may require reordering of lock requests.

In accordance with an embodiment, the lock controller 102A is configured to access either of the primary memory 108 and the secondary memory 112 directly utilizing remote direct memory access (RDMA). In an implementation, one or more clients (or client devices) can create one or more lock requests leveraging the primary memory 108 and the secondary memory 112 utilizing the RDMA. For example, the client device (i.e., the client device comprising the lock controller 102A) and the other client device (i.e., the client device comprising the other lock controller 102B) may create the one or more lock requests leveraging the primary memory 108 and the secondary memory 112 utilizing the RDMA.

In accordance with an embodiment, the primary memory 108 is a primary persistent memory and the secondary memory 112 is a secondary persistent memory. In an implementation, the primary memory 108 and the secondary memory 112 may be used as the primary persistent memory and the secondary persistent memory, respectively. The use of the primary persistent memory and the secondary persistent memory enables the primary lock server 104 and the secondary lock server 106, respectively, to hold the lock requests even during power shutdowns and other such failures.

In accordance with an embodiment, the first order comprises a lock request that appears at a first position and the second order comprises the same lock request that appears at a second position and where the lock controller 102A is further configured to determine that second order differs from the first order in that the second position in the second order is after the first position, and in response thereto send the reorder request. The first order indicates the order of first lock request (i.e., the "RDMA send" command) and first read request in the primary ring buffer lock 110 and the second order indicates the order of the second lock request (i.e., the "RDMA send" command) and the second read request in the mirrored primary ring buffer lock 114. If the other client device (i.e., the client device comprising the other lock controller 102B) asked for the lock at the same time when the client device (i.e., the client device comprising the lock controller 102A) has asked. In such case, the first order and the second order may be different in the respective shared receive queue of the primary lock server 104 and the secondary lock server 106. In such case, when the second order differs from the first order in that the second position in the second order is after the first position, the lock controller 102A is configured to send the reorder request to the secondary lock server 106. The reorder request may correspond to an ordering entry, which is pushed to the secondary lock server 106. To maintain both the shared receive queues, the ordering entry is provided that is responsible for preserving the master order of execution. The ordering entry refers to an ordering-ctrl-entry that indicates, at which location, an entry should appear in the queue to preserve the master order of execution. The location of the entry is based on the first order as well on the second order in the primary ring buffer lock 110 and the mirrored primary ring buffer lock 114, respectively. The reorder request considers only "active" lock entries, where "active" lock entries are the lock requests that are not followed by unlock. Any ctrl or unlock entries are ignored.

In accordance with an embodiment, the lock controller 102A is further configured to determine that second order differs from the first order in that the second position in the second order is before the first position, and in response thereto abstain from sending the reorder request, and to wait for the first position to be reached in the second order for the secondary lock server 106 before executing the lock request at the second position. On comparison of the first order and the second order, the second order differs from the first order in that the second position in the second order is before the first position, in such case, the lock controller 102A is configured to abstain from sending the reorder request to the secondary lock server 106. The lock controller 102A is required to wait for the order to be fixed by the reordering. In another case, if the lock is a read lock and it is granted anyway (that is regardless of the order), the lock controller 102A is configured to continue without waiting. The reorder request adds to the latency but not in a significant amount and this usually not happen. In accordance with an embodiment, the lock controller 102A is further configured to determine one or more positions in the second order that are different from corresponding positions in the first order and send a reorder request for each position. In a case, if there are one or more positions in the second order, which are different from the corresponding positions in the first order, then, in such a case, the lock controller 102A is configured to send the reorder request for each of the one or more positions. In another case, the out of order situation can also be handled by use of a single entry, which is ordering-ctrl-entry. Through this entry, the order become stable, once the out of order is fixed. The entries representing various lock requests received after this ordering-ctrl-entry entry does not require to be fixed if they are in the proper order. Moreover, the use of the ordering-ctrl-entry ensures an earlier requester to depend on itself for continue (and is, in case of locks more likely to be the one that is granted the lock).

In accordance with an embodiment, the lock controller 102A is further configured to determine a current position for a request in the second order that is after a corresponding position in the first order for the same request, determine the position preceding the corresponding position in the first order, and send the reorder request indicating that the request should be after the preceding position in the second order. In a case, if the current position for the request (e.g., lock request) in the second order is after the corresponding position in the first order for the same request, then, in such a case, the lock controller 102A is configured to determine the position preceding the corresponding position in the first order and send the reorder request indicating that the request should be after the preceding position in the second order. By virtue of doing so, the request in the first order and the second order may lie at the same logical place and the order of execution remains maintained.

The lock controller 102A provides a locking mechanism, which ensures low latency (e.g., latency of one single-sided RDMA operation in case of no contention) and flexible policy in case of contention. Alternatively stated, the lock controller 102A may support tryLOCK, wait, spinlock, and the like, in case of contention. The lock controller 102A further provides low CPU consumption and recoverability that means the lock controller 102A ensures that the client device holding the lock is always known and in case of client failure, the lock can be released by the servers. The lock controller 102A is configured to be operatively connected to the primary lock server 104 arranged to implement the primary ring buffer lock 110 utilizing the primary memory 108 and the secondary lock server 106 arranged to implement the mirrored primary ring buffer lock 114 utilizing a secondary memory 112 to send lock and read requests and maintain the execution order of the requests, which further reduces the latency and enables the lock controller 102A to maintain an execution order of the lock requests. By virtue of maintaining the lock request received by different clients through the lock controller 102A, the execution order is maintained by implementing the primary ring buffer lock 110 and the mirrored primary ring buffer lock 114 which improves the locking mechanism effectively and also makes the locking mechanism capable of handling server failures. Moreover, the lock controller 102A ensures fairness, which means that the lock is always served in the order of lock requests and avoids starvation. Additionally, the lock controller 102A supports native deadlock detection and multiple locks.

Figure 2:
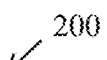
FIG. 2 is a block diagram that illustrates various exemplary components of a client device, in accordance with an embodiment of the present disclosure.
Figure 2:
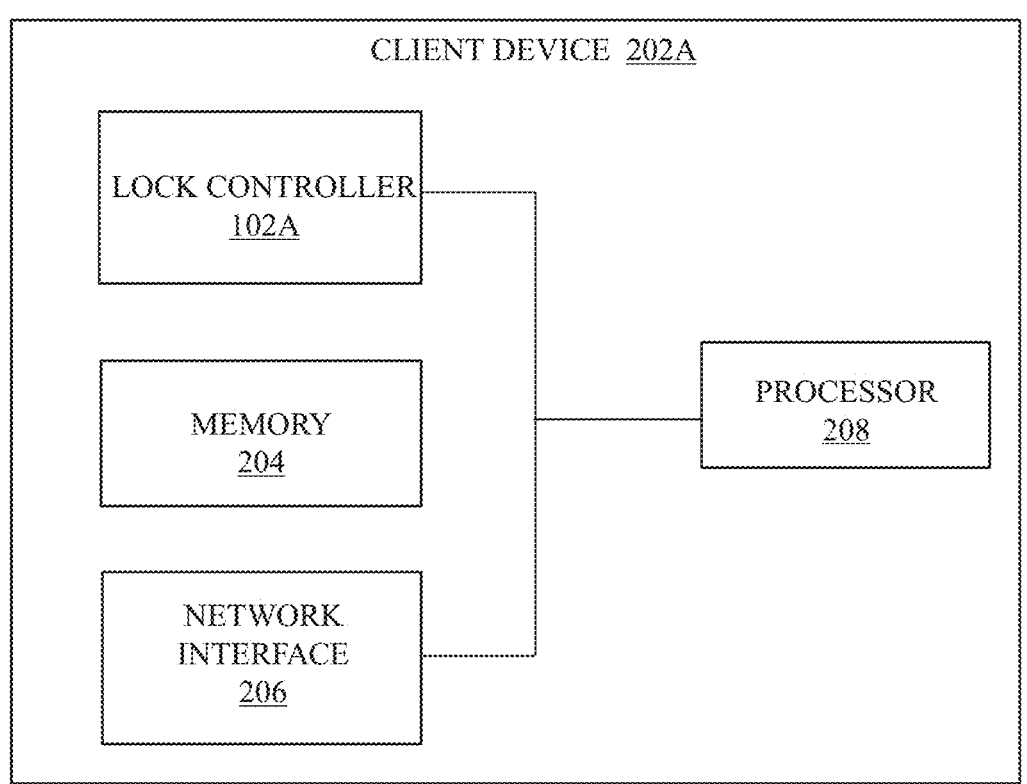

FIG. 2 is a block diagram that illustrates various exemplary components of a client device, in accordance with an embodiment of the present disclosure. FIG. 2 is described in conjunction with elements from FIG. 1. With reference to FIG. 2, there is shown a block diagram 200 that includes a client device 202A. The client device 202A includes the lock controller 102A, a memory 204, a network interface 206 and a processor 208.

The client device 202A may include suitable logic, circuitry, interfaces, and/or code that is configured to be connected to each of the primary lock server 104 and the secondary lock server 106 for even distribution of resources. Examples of the client device 202A may include, but are not limited to, a computer, a personal digital assistant, a portable computing device or an electronic device.

The memory 204 may include suitable logic, circuitry, interfaces, or code that is configured to store the instructions executable by the processor 208. Examples of implementation of the memory 204 may include, but are not limited to, an Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory.

The network interface 206 includes hardware or software that is configured to establish communication among the client device 202A and also with the server sharing resources. Examples of the network interface 206 may include, but are not limited to, a computer port, a network socket, a network interface controller (NIC), and any other network interface device.

The processor 208 may include suitable logic, circuitry, interfaces, or code that is configured to execute the instructions stored in the memory 204. In an example, the processor 208 may be a general-purpose processor. Other examples of the processor 208 may include, but is not limited to a processor, a central processing unit (CPU), a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, a graphics processing unit (GPU), and other processors or control circuitry. Moreover, the processor 208 may refer to one or more individual processors, processing devices, a processing unit that is part of a machine, such as the client device 202A.

In an implementation, the client device 202A comprises the lock controller 102A. The client device 202A through the lock controller 102A requests the required resource from the servers (i.e., the primary lock server 104 and the secondary lock server 106) through the network interface 206. The client device 202A includes the lock controller 102A that is connected to the primary lock server 104 and the secondary lock server 106 to send lock requests, hold the resource and further unlock the shared resource for other clients to use the resource. The client device 202A through the lock controller 102A sends the lock request to get the resource through the network interface 206 and, further, uses the shared resource for further computation through its memory 204. The time till the resource is being shared with the client device 202A, the status of the resource in the queue is on hold. Later, when the use of the shared resource is complete, the resource is unlocked and made available for use to another client device.

Figure 3:
FIG. 3 is a block diagram that illustrates various exemplary components of a lock system, in accordance with an embodiment of the present disclosure.
Figure 3:
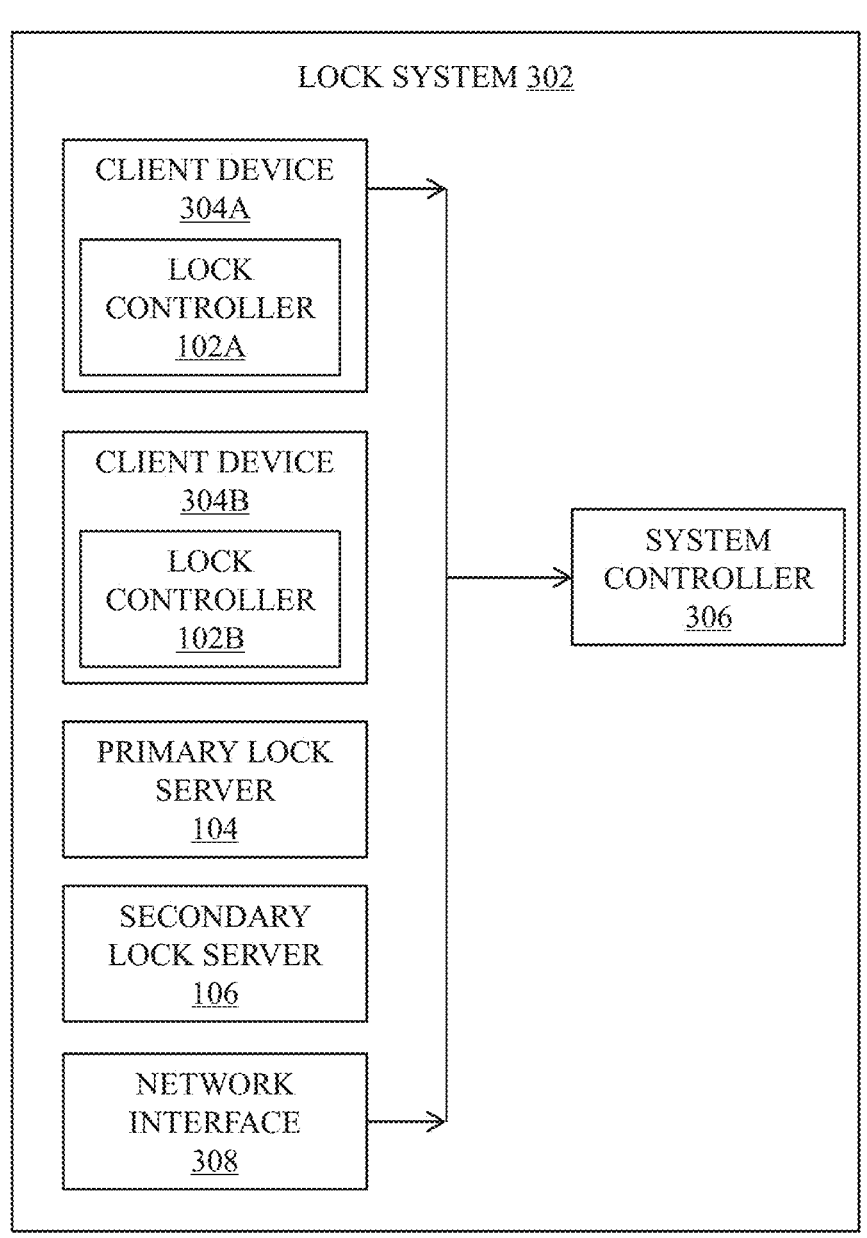

FIG. 3 is a block diagram that illustrates various exemplary components of a lock system, in accordance with an embodiment of the present disclosure. FIG. 3 is described in conjunction with elements from FIGS. 1 and 2. With reference to FIG. 3, there is shown a block diagram 300 that represents a lock system 302. The lock system 302 includes a client device 304A comprising the lock controller 102A (of FIG. 1), another client device 304B comprising the other lock controller 102B (of FIG. 1), the primary lock server 104, the secondary lock server 106 (of FIG. 1), a system controller 306 and a network interface 308.

The client device 304A corresponds to the client device 202A (of FIG. 2) comprising the lock controller 102A (of FIG. 1). The other client device 304B comprising the other lock controller 102B (of FIG. 1) may be configured to ask for the lock at the same time when the client device 304A comprising the lock controller 102A asks. Therefore, the lock system 302 may require reordering of lock requests in case of conflicts between the client device 304A and the other client device 304B. However, the lock system 302 may have more client devices in addition to the client device 304A and the other client device 304B, which may ask for the lock simultaneously. The two client devices (i.e., the client device 304A and the other client device 304B) are shown only for sake of simplicity.

The system controller 306 includes suitable logic, circuitry, interfaces, and/or code that is configured to designate the secondary lock server 106 as the primary lock server 104 and generate a new secondary lock server in case of a server failure. The generated new secondary lock server may function in the same manner as the secondary lock server 106. Examples of implementation of the system controller 306 may include, but are not limited to, a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry.

The network interface 308 includes hardware or software that is configured to establish the communication between the client devices 304A, 304B, the primary lock server 104, and the secondary lock server 106. Examples of the network interface 308 may include but are not limited to a computer port, a network socket, a network interface controller (NIC), and any other network interface device.

In operation, the lock system 302 comprises the client device 304A, the primary lock server 104, the secondary lock server 106 and the system controller 306. The lock system 302 is configured to determine that the primary lock server 104 is failing, and in response, thereto assign the secondary lock server 106 to act as the primary lock server 104 and generate a new secondary lock server. In an implementation, the system controller 306 of the lock system 302 may be used to determine that the primary lock server 104 is failing or not. In a case, if it is determined that the primary lock server 104 is failed, then, the system controller 306 may be configured to assign the secondary lock server 106 to act as the primary lock server 104. The assignment of the secondary lock server 106 as the primary lock server 104 may be performed by using a raft algorithm. Generally, a raft algorithm may be defined as a consensus algorithm, where all the nodes (i.e., clients) attached to the server (e.g., the primary lock server 104, the secondary lock server 106) agree to consider other nodes as a server. All clients that have outstanding locks will be notified about such assignment (i.e., the assignment of the secondary lock server 106 as the primary lock server 104). Furthermore, the client device 304A may be configured to send new requests to the secondary lock server 106 which now acts as the primary lock server 104. Since the client devices (e.g., the client device 304A and the other client device 304B) are synchronized before the secondary lock server 106 becomes the primary lock server 104, therefore, no new reorder commands are received after the synchronization process, and the locking mechanism remains up to date. Moreover, the system controller 306 of the lock system 302 is further configured to generate the new secondary lock server using the raft algorithm. The generated new secondary lock server acts the secondary lock server 106.

Beneficially, the assignment of the secondary lock server 106 as the primary lock server 104 and generation of the new secondary lock server, in case of server failure, enables the lock system 302 to efficiently handle the server failure.

Figure 4:
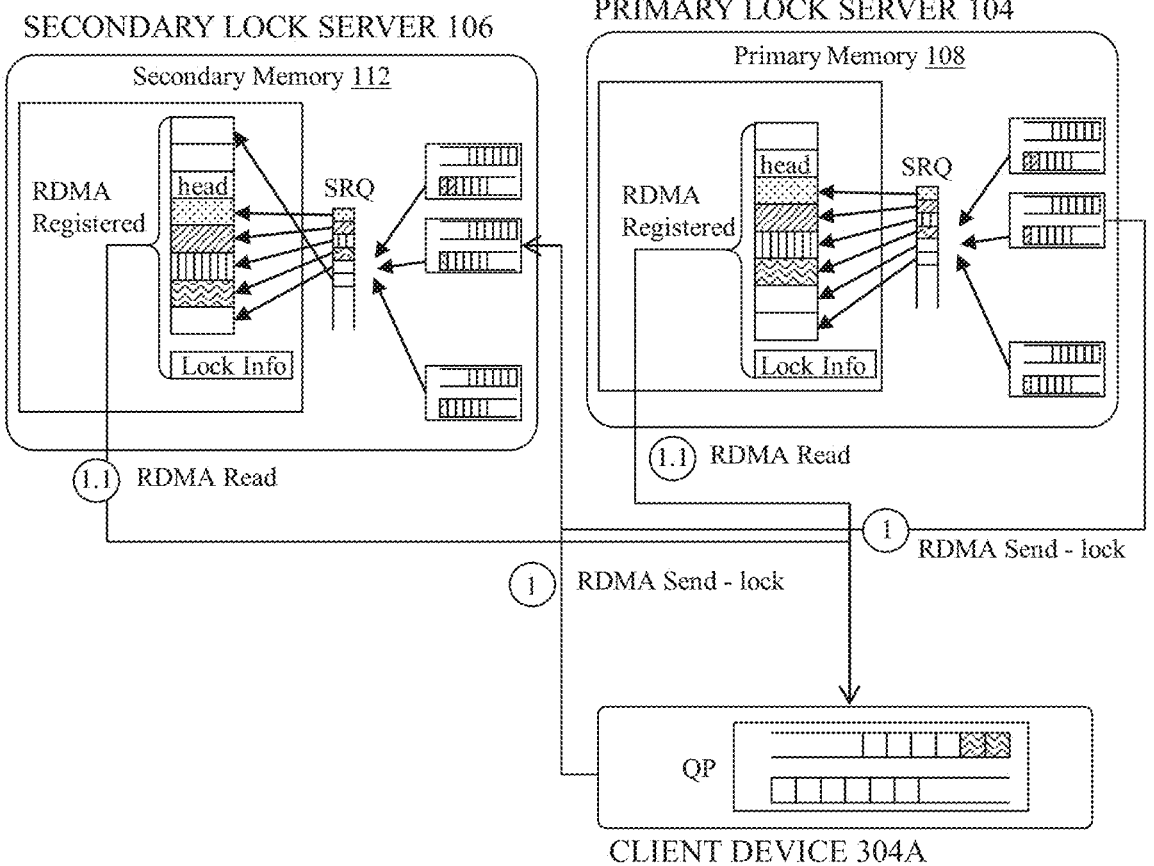
FIG. 4 is an illustration of primary server and secondary server, in accordance with an embodiment of the present disclosure.

FIG. 4 is an implementation scenario of a highly available locking mechanism that includes a primary lock server and a secondary lock server, in accordance with an embodiment of the present disclosure. FIG. 4 is described in conjunction with elements from FIGS. 1, 2, and 3. With reference to FIG. 4, there is shown the primary lock server 104, the secondary lock server 106 and the client device 304A. There is further shown that the primary lock server 104 comprises the primary memory 108 and the secondary lock server 106 comprises the secondary memory 112.

Both the primary lock server 104 and the secondary lock server 106 have their own associated queue (i.e., shared resource queue) to provide the order of lock requests to the lock controller 102A. The client device 304A sends a first lock request (e.g., a RDMA send, also represented by a numeral "1") to the primary lock server 104 and a second lock request (e.g., a RDMA send, also represented by the numeral "1") to the secondary lock server 106. The sent first lock request (i.e., RDMA send) and the second lock request (i.e., RDMA send) is stored in the respective shared receive queue (i.e., SRQ) of each of the primary lock server 104 and the secondary lock server 106. Thereafter, a first read request (i.e., RDMA read, also represented by a numeral "1.1") is sent to the primary lock server 104 and a second read request (i.e., RDMA read, also represented by a numeral "1.1") is sent to the secondary lock server 106. The first read request and the second read request provides the current status of the primary ring buffer lock 110 and the mirrored primary ring buffer lock 114 to the client device 304A. Thereafter, the client device 304A comprising the lock controller 102A receives a first order indicating the order of the first lock request and the first read request from the primary lock server 104 and a second order indicating the order of the second lock request and the second read request from the secondary lock server 106. The client device 304A compares the first order and the second order and find no difference between the two orders, which means there is no contention. Alternatively stated, there is no other client device is asking for the lock simultaneous to the client device 304A. However, in practice, there may be two or more client devices, such as the other client device 304B in addition to the client device 304A, in the considered implementation scenario of the highly available locking mechanism. The client device 304A and the other client device 304B may ask for the lock simultaneously, from each of the primary lock server 104 and the secondary lock server 106. And, in such case, the reordering of lock requests is required in order to maintain a master order of execution while ensuring the low latency. The reordering of lock requests has been described in detail, for example, in FIG. 1. By virtue of reordering of the lock requests, the shared receive queues in each of the primary lock server 104 and the secondary lock server 106 are maintained and updated so that the master order of execution of lock requests is maintained.

FIG. 5 is an illustration of servers describing reordering of the lock requests, in accordance with an embodiment of the present disclosure. FIG. 5 is described in conjunction with elements from FIGS. 1, 2, 3, and 4. With reference to FIG. 5, there is shown an exemplary scenario indicating a queue maintained by each of the primary lock server 104 and the secondary lock server 106. There is further shown an ordered queue that is created after reordering the entry in the secondary lock server 106. There is further shown multiple client devices, such as a client 1 (also represented by C1), client 2 (also represented by C2), client 3 (also represented by C3), client 4 (also represented by C4), client 5 (also represented by C5), client 6 (also represented by C6) and client 7 (also represented by C7).

Each of the primary lock server 104 and the secondary lock server 106 maintains a queue of the lock requests (e.g., a lock request represented by "L" and an unlock request represented by "U") created by one or more of the multiple client devices, such as client 1 (i.e., C1), client 2 (i.e., C2), client 3 (i.e., C3), client 4 (i.e., C4), client 5 (i.e., C5), client 6 (i.e., C6) and client 7 (i.e., C7). On the primary lock server 104, the lock requests created by one or more of the multiple client devices, such as client 1 (i.e., C1), client 2 (i.e., C2), client 3 (i.e., C3), client 4 (i.e., C4), client 5 (i.e., C5), client 6 (i.e., C6) and client 7 (i.e., C7), appear in an order. For example, a lock request (e.g., L) created by the client 1 (i.e., C1) appears at first in the primary lock server 104 as well as in the secondary lock server 106. Furthermore, the lock requests created by one or more of the multiple client devices, such as client 1 (i.e., C1), client 2 (i.e., C2), client 3 (i.e., C3), client 4 (i.e., C4), client 5 (i.e., C5), client 6 (i.e., C6) and client 7 (i.e., C7), such as the C2-L, C3-L, C1-U, C5-L, C4-L, C2-U appear in the same order in primary lock server 104 and the secondary lock server 106, up to the lock request created by the client 6 (i.e., C6). Moreover, the lock request (e.g., "L") created by the client 6 (i.e., C6) appears before the lock request (e.g., "L") created by the client 2 (i.e., C2), which appears before the lock request (e.g., "L") created by the client 1 (i.e., C1). However, this order is different on the secondary lock server 106. On the secondary lock server 106, the lock request (e.g., "L") created by the client 1 (i.e., C1) appears before the lock request (e.g., "L") created by the client 2 (i.e., C2), which appears before the lock request (e.g., "L") created by the client 6 (i.e., C6). The reason behind the different order is that the client 6, the client 2 and the client 1 have asked for the lock requests simultaneously, hence require reordering of lock requests. For reordering of the lock requests, the client 6 (i.e., C6), which is at first in the order in the primary lock server 104 is configured to send a reorder request to all locks that had different order in the secondary lock server 106. The client 6 (i.e., C6) is configured to send the reorder request stating that the lock request in slot 11 (represented as C6-L) should move to slot 9.0, that is before the client 1 (i.e., C1) and the client 2 (i.e., C2). Moreover, the client 2 (i.e., C2) is configured to send a reorder request stating that the lock request in slot 10 (represented as C2-L) should move to slot 9.1, that is before the client 1 (i.e., C1). In this way, the reordering of lock requests is performed in order to maintain a master order of execution while ensuring a low latency.

If any lock request is bypassed in the secondary lock server 106, the client device (e.g., the client device 304A) is configured to send an ordering-ctrl-entry to the secondary lock server 106. A bypassing client device will not continue until the queue is ordered with respect to itself, and can also push the ordering-ctrl-entry for the bypassed client device. This enables the primary lock server 104 and the secondary lock server 106 to avoid dead\live lock in case of failed\hiccup client. A threshold time can also be determined after which the client device will send such entry by himself. Unlock and cyclic-buff-management is identical in the primary lock server 104 and the secondary lock server 106.

FIG. 6 is a flowchart of a method of controlling a lock for a client device, in accordance with an embodiment of the present disclosure. FIG. 6 is described in conjunction with elements from FIGS. 1,2,3,4 and 5. With reference to FIG. 6, there is shown a flowchart of a method 600 that includes the steps 602-to-614. The lock controller 102A (of FIG. 1) is configured to execute the method 600.

There is provided the method 600 of controlling a lock for a client device 304A operatively connected to the primary lock server 104 arranged for implementing the primary ring buffer lock 110 utilizing the primary memory 108 and the secondary lock server 106 arranged to implement the mirrored primary ring buffer lock 114 utilizing the secondary memory 112, where the lock controller 102A is configured to access either of the primary memory 108 and the secondary memory 112 directly utilizing remote direct memory access. The method 600 is used to improve the efficiency of the lock system 302, such as through lowering down the latency of the locking system and maintaining execution order of the lock requests during the server failures. The lock controller 102A is configured for keeping the track of execution order through primary lock server 104 and the secondary lock server 106. The lock controller 102A is configured for connecting the two servers that is the primary lock server 104 and the secondary lock server 106, for implementing a locking mechanism. Each of the primary lock server 104 and the secondary lock server 106 is maintaining a ring of lock tickets in the primary ring buffer lock 110 and the mirrored primary ring buffer lock 114, respectively that is accessible by RDMA memory from any client. The lock ticket contains client ID, lock-operation, pending lock numbers and a timestamp, which is optional. The lock ticket further includes one bit for a lock operation that represents two operations, either "LOCK", or "UNLOCK", from which the lock is handled. The pending lock number is referring to the number of clients waiting for the lock during the execution slot for their particular ticket. The pending lock numbers are updated during clean-up of the primary ring buffer lock 110 and the mirrored primary ring buffer lock 114 so that the exact pending lock numbers can be achieved. The number of pending locks can be as high as the maximum number of clients and thus, requires the same number of bits as that of the client ID. The timestamp provides information for statistics and debugging. The multiple locks may be synchronized by using a shared receive queue (SRQ) of each of the primary lock server 104 and the secondary lock server 106.

At step 602, the method 600 includes sending a first lock request to the primary lock server 104. In an implementation, the first lock request may be "LOCK" operation that is received by the primary lock server 104. In such implementation, the lock controller 102A may be configured to send a "RDMA send" to the primary lock server 104. In another implementation, the first lock request may be an "UNLOCK" operation. In such implementation, the lock controller 102A is configured for creating a ticket with the client ID and lock operation set to "UNLOCK". The lock controller 102A is further configured for sending the ticket inline, without waiting for completion.

At step 604, the method 600 further includes sending a first read request to the primary lock server 104. The lock controller 102A is configured to send the first read request to the primary lock server 104. In an implementation, the first read request may be a "RDMA read" request. The first read request is used to read the primary ring buffer lock 110 and hence, provides the current status of the primary ring buffer lock 110 to the lock controller 102A. The first read request provides the information related to the number of locks, hold, and unlocks to the lock controller 102A. The more details have been provided, for example, in FIG. 1.

At step 606, the method 600 further includes sending a second lock request to the secondary lock server 106. The lock controller 102A is configured to send the second lock request to the secondary lock server 106. The second lock request may be either a "LOCK" operation or an "UNLOCK" operation that is received by the secondary lock server 106. Moreover, the lock controller 102A is configured to send the first lock request and the second lock request simultaneously, to the primary lock server 104 and the secondary lock server 106, respectively.

At step 608, the method 600 further includes sending a second read request to the secondary lock server 106. The lock controller 102A is configured to send the second read request to secondary lock server 106. The second read request is used to read the mirrored primary ring buffer lock 114 of the secondary lock server 106. The second read request (e.g., RDMA read) provides the current status of the mirrored primary ring buffer lock 114 to the lock controller 102A. The second read request provides the information related to the number of locks, hold and unlocks to the lock controller 102A so that the secondary lock server 106 can maintain the shared receive queue.

At step 610, the method 600 further includes receiving a first order indicating the order of the first lock request and the first read request from the primary lock server 104. The lock controller 102A is configured to receive the first order indicating the order of the first lock request and the first read request from the primary lock server 104. The first order indicates the order of the first lock request in the primary ring buffer lock 110.

At step 612, the method 600 further includes receiving a second order indicating the order of the second lock request and the second read request from the secondary lock server 106. The lock controller 102A is configured to receive the second order indicating the order of the second lock request and the second read request from the secondary lock server 106. The second order indicates the order of the second lock request in the mirrored primary ring buffer lock 114.

At step 614, the method 600 includes comparing the first and second order, and if the second order differs from the first order, then sending a reorder request to the secondary lock server 106 indicating the first order. In a case, when there is only a single client device (e.g., the client device 304A comprising the lock controller 102A) requesting for the lock, the lock controller 102A is configured to read the ring buffers (i.e., the primary ring buffer lock 110 and the mirrored primary ring buffer lock 114) of each of the servers and receive the first order related to the first lock request and the second order related to the second lock request. Thereafter, the lock controller 102A is configured to compare the received first order and the second order. If no other client device asked for the lock at the same time, then, the first lock request and the second lock request lie at the same logical place in the respective shared receive queue (SRQ) of the primary lock server 104 and the secondary lock server 106, which means that the first lock request and the second lock request are handled at the same time. In another case, if another client device (e.g., the client device 304B comprising the other lock controller 102B) asked for the lock at the same time when the client device (i.e., the client device 304A comprising the lock controller 102A) has asked. In such case, the first order and the second order may be different in the respective shared receive queue of the primary lock server 104 and the secondary lock server 106. Alternatively stated, the first order and the second order may be different on one server than on another server. In such case, when the second order differs from the first order, the lock controller 102A is configured to send the reorder request to the secondary lock server 106 indicating the first order. However, in practice, in addition to the client device 304A comprising the lock controller 102A and the other client device 304B comprising the other lock controller 102B, there may be multiple client devices with the respective lock controllers, which may ask for the lock simultaneously, hence, the order of lock requests received from each of the primary lock server 104 and the secondary lock server 106 differs and therefore, require reordering of lock requests in order to maintain a master order of execution.

In accordance with an embodiment, the method 600, further comprising accessing either of the primary memory 108 and the secondary memory 112 directly utilizing remote direct memory access (RDMA). In an implementation, one or more client devices, such as the client device 304A comprising the lock controller 102A and the other client device 304B comprising the other lock controller 102B, can create one or more lock requests leveraging the primary memory 108 and the secondary memory 112 utilizing the RDMA.

In accordance with an embodiment, the first order comprises a lock request that appears at a first position and the second order comprises the same lock request that appears at a second position, and where the method 600 further comprises determining that second order differs from the first order in that the second position in the second order is after the first position, and in response thereto send the reorder request. The first order indicates the order of first lock request and first read request in the primary ring buffer lock 110 and the second order indicates the order of the second lock request and the second read request in the mirrored primary ring buffer lock 114. If the other client device 304B comprising the other lock controller 102B asked for the lock at the same time when the client device 304A comprising the lock controller 102A has asked. In such case, the first order and the second order may be different in the respective shared receive queue of the primary lock server 104 and the secondary lock server 106. In such case, when the second order differs from the first order in that the second position in the second order is after the first position, the lock controller 102A is configured to send the reorder request to the secondary lock server 106.

In accordance with an embodiment, the method 600, further comprising determining that second order differs from the first order in that the second position in the second order is before the first position, and in response thereto abstain from sending the reorder request, and waiting for the first position to be reached in the second order for the secondary lock server 106 before executing the lock request at the second position. On comparison of the first order and the second order, the second order differs from the first order in that the second position in the second order is before the first position, in such case, the lock controller 102A is configured to abstain from sending the reorder request to the secondary lock server 106. The lock controller 102A is required to wait for the order to be fixed by the reordering. In another case, if the lock is a read lock and it is granted anyway (that is regardless of the order), the lock controller 102A is configured to continue without waiting.

In accordance with an embodiment, the method 600, further comprising determining one or more positions in the second order that are different from corresponding positions in the first order, and sending a reorder request for each position. In a case, if there are one or more positions in the second order, which are different from the corresponding positions in the first order, then, in such a case, the lock controller 102A is configured to send the reorder request for each of the one or more positions. In another case, the out of order situation can also be handled by use of a single entry, which is ordering-ctrl-entry. Through this entry, the order become stable, once the out of order is fixed. The entries representing various lock requests received after this ordering-ctrl-entry entry does not require to be fixed if they are in the proper order.

In accordance with an embodiment, the method 600, further comprising determining a current position for a request in the second order that is after a corresponding position in the first order for the same request, determining the position preceding the corresponding position in the first order, and sending the reorder request indicating that the request should be after the preceding position in the second order. In a case, if the current position for the request (e.g., lock request) in the second order is after the corresponding position in the first order for the same request, then, in such a case, the lock controller 102A is configured to determine the position preceding the corresponding position in the first order and send the reorder request indicating that the request should be after the preceding position in the second order. By virtue of doing so, the request in the first order and the second order may lie at the same logical place and the order of execution remains maintained.

The method 600 is used for providing an advanced feature for the locking mechanism and also ensures low latency and handles server failure. The method 600 provides the lock controller 102A that is configured to be operatively connected to the primary lock server 104 arranged to implement the primary ring buffer lock 110 utilizing the primary memory 108 and the secondary lock server 106 arranged to implement the mirrored primary ring buffer lock 114 utilizing the secondary memory 112 to send lock and read requests and maintain the execution order of the requests, which further reduces the latency. By virtue of maintaining the lock request received by different clients through the lock controller 102A and the lock controller 102B and maintaining the execution order by implementing the primary ring buffer lock 110 and the mirrored primary ring buffer lock 114 using two servers that improves the lock mechanism effectively, and handle server failures which further efficiently reduces the latency.

The steps 602 to 614 are only illustrative, and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including," "comprising," "incorporating," "have," "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments." It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A device comprising a lock controller, a processor, and a memory, wherein the lock controller is configured to be operatively connected to a primary lock server, arranged to implement a primary ring buffer lock utilizing a primary memory, and a secondary lock server, arranged to implement a mirrored primary ring buffer lock utilizing a secondary memory, wherein the lock controller is further configured to:

send a first lock request to the primary lock server;

send a first read request to the primary lock server;

send a second lock request to the secondary lock server;

send a second read request to the secondary lock server;

receive, from the primary lock server, information indicating a first execution order of at least the first lock request based on a first position of the first lock request at the primary ring buffer lock relative to other requests at the primary ring buffer lock;

receive, from the secondary lock server, information indicating a second execution order of at least the second lock request based on a second position of the second lock request at the mirrored primary ring buffer lock relative to other requests at the primary ring buffer lock;

determine whether the second position in the second execution order is before or after the first position in the first execution order;

send a reorder request to the secondary lock server based on the second position being after the first position, wherein the secondary lock server receives and executes the reorder request; and abstain from sending the reorder request to the secondary lock server based on the second position being before the first position, and wait for a position to be reached in the second execution order that corresponds to the first position of the first execution order before executing the second lock request so that the first and second lock requests are executed in an execution order consistent with the first execution order.

2. The lock controller according to claim 1, wherein the lock controller is further configured to determine more than one position in the mirrored primary ring buffer lock that are different from corresponding more than one positions in the primary ring buffer lock; and send a reorder request to the secondary lock server for each lock request whose position in the mirrored primary ring buffer lock is after a position of a same lock request at the primary ring buffer lock.

3. The lock controller according to claim 1, wherein to send the reorder request, the lock controller is further configured to:

determine a current position for a lock or read request in the mirrored primary ring buffer lock that is after a corresponding position in the primary ring buffer lock for the same lock or read request;

determine a position in the mirrored primary ring buffer lock preceding a corresponding position in the primary ring buffer lock; and send the reorder request indicating that the lock or read request in the mirrored primary ring buffer lock should be after the preceding position.

4. The lock controller according to claim 1, wherein the lock controller is configured to access either of the primary memory and the secondary memory directly utilizing remote direct memory access.

5. The lock controller according to claim 1, wherein the primary memory is a primary persistent memory and the secondary memory is a secondary persistent memory.

6. A lock system comprising a lock controller, a primary lock server comprising a primary memory, a secondary lock server comprising a secondary memory and a system controller configured to determine that the primary lock server is failing and, in response thereto, assign the secondary lock server to act as the primary lock server and generate a new secondary lock server, wherein the primary lock server is arranged to implement a primary ring buffer lock utilizing the primary memory, and wherein the secondary lock server is arranged to implement a mirrored primary ring buffer lock utilizing the secondary memory; and wherein the lock controller is configured to:

send a first lock request and a first read request to the primary lock server;

send a second lock request and a second read request to the secondary lock server;

receive, from the primary lock server, information indicating a first execution order of at least the first lock request based on a first position of the first lock request at the primary ring buffer lock relative to other requests at the primary ring buffer lock;

receive, from the secondary lock server, information indicating a second execution order of at least the second lock request based on a second position of the second lock request at the mirrored primary ring buffer lock relative to other requests at the primary ring buffer lock;

determine whether the second position in the second execution order is before or after the first position in the first execution order;

send a reorder request to the secondary lock server based on the second position being after the first position, wherein the secondary lock server receives and executes the reorder request; and abstain from sending the reorder request to the secondary lock server based on the second position being before the first position, and wait for a position to be reached in the second execution order that corresponds to the first position of the first execution order before executing the second lock request so that the first and second lock requests are executed in an execution order consistent with the first execution order.

7. The lock system of claim 6, wherein the lock controller is further configured to:

determine more than one position in the mirrored primary ring buffer lock that are different from corresponding more than one positions in the primary ring buffer lock; and send a reorder request to the secondary lock server for each lock request whose position in the mirrored primary ring buffer lock is after a position of a same lock request at the primary ring buffer lock.

8. The lock system of claim 6, wherein to send the reorder request, the lock controller is further configured to:

determine a current position for a lock or read request in the mirrored primary ring buffer lock that is after a corresponding position in the primary ring buffer lock for the same lock or read request;

determine a position in the mirrored primary ring buffer lock preceding a corresponding position in the primary ring buffer lock and send the reorder request indicating that the lock or read request in the mirrored primary ring buffer lock should be after the preceding position.

9. The lock system of claim 6, wherein the lock controller is configured to access either of the primary memory and the secondary memory directly utilizing remote direct memory access.

10. The lock system according to claim 6, wherein the primary memory is a primary persistent memory and the secondary memory is a secondary persistent memory.

11. A method of controlling a lock for a client device operatively connected to a primary lock server, arranged to implement a primary ring buffer lock utilizing a primary memory, and a secondary lock server, arranged to implement a mirrored primary ring buffer lock utilizing a secondary memory, the method comprising:

sending a first lock request to the primary lock server;

sending a first read request to the primary lock server;

sending a second lock request to the secondary lock server;

sending a second read request to the secondary lock server;

receiving, from the primary lock server, information indicating a first execution order of at least the first lock request based on a first position of the first lock request at the primary ring buffer lock relative to other requests at the primary ring buffer lock;

receiving, from the secondary lock server, information indicating a second execution order of at least the second lock request based on a second position of the second lock request at the mirrored primary ring buffer lock relative to other requests at the mirrored primary ring buffer lock;

determining whether the second position in the second execution order is before or after the first position in the first execution order;

sending a reorder request to the secondary lock server based on the second position being after the first position; and abstaining from sending the reorder request to the secondary lock server based on the second position being before the first position, and waiting for a position to be reached in the second execution order that corresponds to the first position of the first execution order before executing the second lock request so that the first and second lock requests are executed in an execution order consistent with the first execution order.

12. The method according to claim 11, wherein the method further comprises:

determining more than one position in the mirrored primary ring buffer lock that are different from corresponding more than one positions in the primary ring buffer lock; and sending a reorder request to the secondary lock server for each lock request whose position in the mirrored primary ring buffer lock is after a position of a same lock request at the primary ring buffer lock.

13. The method according to claim 11, wherein to send the reorder request, the method further comprises:

determining a current position for a lock or read request in the mirrored primary ring buffer lock that is after an associated position in the primary ring buffer lock for the same lock or read request;

determining a position in the mirrored primary ring buffer lock preceding an associated position in the primary ring buffer lock; and sending the reorder request indicating the lock or read request in the mirrored primary ring buffer lock should be after the preceding position.

14. The method according to claim 11, wherein the method further comprises directly accessing either of the primary and secondary memories utilizing a remote direct memory access.

15. The method according to claim 11, wherein the primary memory is a primary persistent memory and the secondary memory is a secondary persistent memory.

\* \* \* \* \*